United States Patent Office 2,744,902
Patented May 8, 1956

2,744,902

ALKYL NAPHTHYL QUATERNARY AMMONIUM COMPOUNDS

Benjamin R. Harris, Glencoe, Ill., assignor, by mesne assignments, to Emulsol Chemical Corporation, Chicago, Ill., a corporation of Illinois No Drawing. Application February 23, 1954, Serial No. 412,108

9 Claims. (Cl. 260—290)

This invention relates to germ-counteracting agents and to compositions for counteracting the effect of various microorganisms, said agents and compositions being highly useful for bactericidal, germicidal, bacteriostatic, prophylatic, antiseptic and fungicidal purposes which, for convenience, are hereafter referred to as germ-counteracting agents and compositions. The germ-counteracting compositions of the present invention contain, as an effective germ-counteracting agent, certain agents or compounds, or mixtures thereof, which can be represented by the formulae

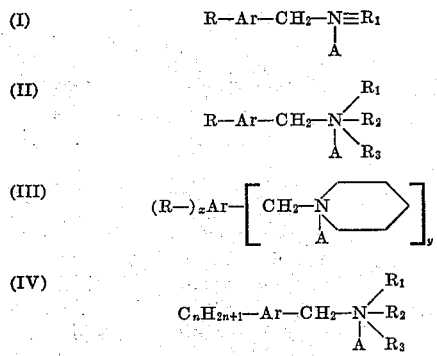

where R is an alkyl radical containing from 12 to 18 carbon atoms, $x$ and $y$ are integers not greater than 2, Ar is a naphthalene or lower alkyl naphthalene radical, A is an anion, particularly one selected from the group consisting of chlorine, bromine and iodine, and $R_1$, $R_2$ and $R_3$ are hydrocarbon radicals, particularly lower alkyl radicals such as methyl, ethyl and propyl, each of $R_1$, $R_2$ and $R_3$ advantageously containing no more than 5 to 7 carbon atoms and together totaling no more than 10 carbon atoms, or $R_1$, $R_2$ and $R_3$ together with the nitrogen comprise a hetero-cyclic radical such as pyridine, quinoline or the like, and $n$ is an integer from 12 to 18. Various of the more specific agents may be characterized as comprising quaternary ammonium compounds having attached to the quaternary nitrogen atom thereof (1) an acid-forming anion, for instance, halogen, (2) a hydrocarbon benzyl group, ring substituted with from one to three alkyl groups, one of which contains from 11 to 16 or 12 to 18 carbon atoms and any other one of which contains not over 4 carbon atoms, and (3) three alkyl groups of not over 5 carbon atoms each, or a trivalent hydrocarbon chain which jointly with the nitrogen forms a pyridine or pyridine homologue heterocycle.

Illustrative germ-counteracting agents falling within the scope of the invention are the following:

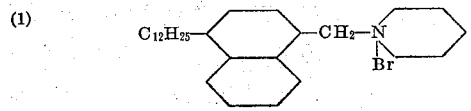

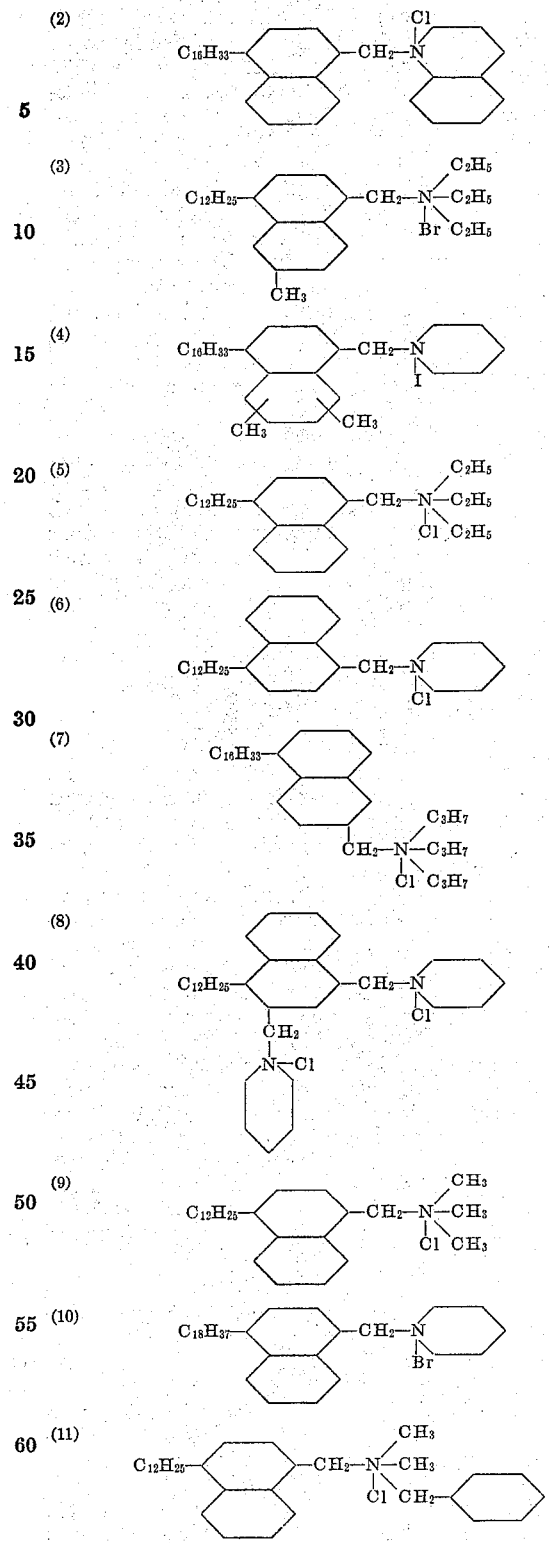

A particularly preferred method for the preparation of the germ-counteracting agents of the present invention involves reacting a previously produced alkylated naphthalene or alkylated alkyl substituted naphthalene, for instance a kerylnaphthalene whose keryl group is derived from a petroleum hydrocarbon distillate, with glacial acetic acid in the presence of paraformaldehyde or trioxymethylene and in the presence of an anhydrous condensing agent as, for example, zinc chloride, ferric chloride, or aluminum chloride, the reaction being carried out at relatively low temperatures, for example, of the order of 60 to 65 degrees C., cooling being employed if necessary. In carrying out this reaction, the aforementioned ingredients are intermixed and a brisk stream of dry hydrogen chloride gas is introduced into the stirred mixture while maintaining it at the aforementioned temperatures with occasional cooling, if necessary. The reaction mixture is then cooled, petroleum ether added thereto, and the mixture is then allowed to settle. The lower layer is discarded and the top layer can be washed with 10% sodium hydroxide solution and then with water. The petroleum ether solution is then dried over anhydrous sodium sulfate, the ether is distilled off, and the residue mixed with pyridine, trimethylamine or triethylamine or other tertiary amines and heated to about 100 degrees C. for the requisite period of time. The desired compound is readily recoverable from the reaction mixture by appropriate solvent treatments, for example, through the utilization of petroleum ether.

The examples hereinafter set forth are illustrative of the production of germ-counteracting agents falling within the scope of the invention. As indicated above, it will be appreciated that other methods may be utilized. It will also be understood that proportions of ingredients and temperatures and times of reaction may be varied; that different combinations of reactants may be utilized; and that various processes of purification and the like may be resorted to wherever found desirable or convenient. These and other variations and modifications will be clear to those versed in the art in the light of the guiding principles which are disclosed herein.

*Example 1*

(a) 78 grams of mono-lauryl naphthalene and 60 grams of chloromethyl ether were dissolved in 100 cc. of carbon disulfide. To the well stirred solution, cooled to 0 degrees C., there were added, dropwise, 125 grams of anhydrous stannic chloride. The reaction mixture was agitated for about an hour while maintained at temperature of about 0 degrees C. Agitation was continued until the reaction mixture reached room temperature whereupon said mixture was poured into ice water. The organic layer was separated and the aqueous solution was extracted with ligroin. The combined organic solutions were dried over calcium chloride and the solvents were distilled from the solution after filtration.

(b) 25 cc. of the residue, produced in part (a) hereof, were admixed with 16 cc. of pyridine. The mixture was heated for 2 hours at 60 degrees C. and was then set aside for about 2 days at room temperature. The resulting viscous liquid reaction mixture was treated with dry ethyl ether whereupon a white solid precipitated. It comprised essentially a compound having the formula:

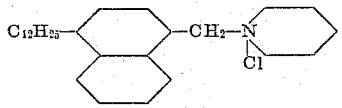

*Example 2*

100 grams of redistilled dodecyl naphthalene, 30 grams of glacial acetic acid, 18 grams of anhydrous zinc chloride, and 14 grams of paraformaldehyde were heated, with stirring, to 60–65 degrees C. Then a brisk stream of dry hydrogen chloride gas was introduced into the stirred mixture which was maintained at 60–65 degrees C. by occasional cooling. The hydrogen chloride stream was stopped after about 17 grams of gas had been absorbed. The mixture was then cooled, 120 grams of petroleum ether were added and the material was allowed to settle. The lower layer which contained practically all of the zinc was discarded. The top layer was washed with 80 grams of a 10% sodium hydroxide solution and then with 100 cc. of water. The petroleum ether solution was then dried over anhydrous sodium sulfate and the solvent distilled off. The weight of the residue was 120 grams. This residue was then admixed with 27 grams of pyridine and the mixture was heated to 100 degrees C. for 90 minutes. The resulting viscous liquid was poured into 200 cc. of petroleum ether and agitated vigorously. The petroleum ether was poured off and the residual material was triturated with petroleum ether. This treatment was repeated until the compound was converted into a brittle powder. The solid was filtered off by suction and kept in a desiccator. The yield was 90 grams.

The solid dodecyl naphthylmethylpyridinium chloride is readily soluble in water.

The aliphatic (including cycloaliphatic) radical represented by R in the general formulae set forth above is straight chain or branched chain, substituted or unsubstituted, and saturated or unsaturated. It is particularly preferred that it be a straight chain, saturated alkyl radical containing from 12 to 18 carbon atoms, especially from 12 to 16 carbon atoms. Representative examples of such radicals are dodecyl, tetradecyl, hexadecyl, octadecyl, 2-butyloctyl, 2-butyltetradecyl, mixtures thereof, or mixtures derived from petroleum hydrocarbons, and the like. Olefins which may, for example, be used as a source of alkyl radicals include, for example, pressure distillate, cracked distillate, and olefin polymers and the like, for instance, tetrapropylene, such olefins containing from 12 to 18 carbon atoms and being particularly rich in mixtures of $C_{12}$ to $C_{15}$ olefins.

The radical represented by Ar in the general formulae set forth above is naphthalene or lower alkyl-substituted naphthalenes as, for example, methyl naphthalenes, ethyl naphthalenes, isopropyl naphthalene, butyl naphthalene and the like. Particularly satisfactory results are obtained where the Ar radical is an unsubstituted naphthalene radical.

The tertiary amines which are utilized in the preparation of the germ-counteracting agents to introduce the quaternary ammonium radical therein may be selected from a large group, including aliphatic amines and aromatic amines, representative examples of which are trialkyl amines such as trimethylamine, triethylamine, tributylamine, dimethyl monoethyl amine, methyl morpholine, alkyl esters of N-substituted amino acids, dibutyl monoethyl amine; alkyl-aryl amines such as those having one alkyl and two aryl groups or two alkyl and one aryl groups, examples of which are benzyl morpholine, dimethylbenzylamine, dibenzylmethylamine, and diethyl aniline; heterocyclic amines such as pyridine and its homologues, quinolines, α- and β-picoline, N-substituted pyrroles, and substituted heterocyclic amines. Pyridine is particularly satisfactory in most cases. In general, the tertiary amine advantageously contains at most 10 carbon atoms.

As indicated by the various examples, the negative radical or anion or acid-forming or salt-forming anionic radical in the quaternary ammonium radical is preferably halogen. It may, however, be $OH^-$, $HSO_4^-$, $NO_3^-$, acetate, borate, propionate,

$CH_3$—$SO_4^-$, or some other organic or inorganic anion of solubilizing character. As a general rule, the compounds are particularly satisfactory where the anion is chlorine.

The germ-counteracting agents which are used in accordance with the present invention have the particularly desirable features of possessing not only exceptionally good germ-counteracting properties but, in addition, they possess, in general, very advantageous detergent and surface-active properties.

The phenol coefficients of the germ-counteracting agents of the present invention, determined by the F. D. A.

Method, in connection with *M. aureus* and *E. coli*, are very high, the compound dodecylnaphthylmethyl triethylammonium chloride, for instance, having a phenol coefficient of 833.3 with respect to *M. aureus* and 142.9 with *E. coli*.

Where the germ-counteracting agents of the present invention are used primarily for their germ-counteracting properties, they are preferably used in the form of dilute aqueous solutions, for example, 0.005% to 0.1%, with or without modifying agents as, for instance, buffers or the like to effect control of pH. Where used for hair shampoo or like purposes, they are used in at least 6% aqueous solutions and preferably in from 10% to 15% aqueous solutions. In any event, it is advantageous to market the germ-counteracting agents in the form of concentrates, for example, aqueous solutions containing from about 25% to about 40% of the germ-counteracting agents, depending upon the solubility of the particular agents selected. In use, such concentrates may be diluted to a degree suitable for the particular purpose in view. While it is preferred to utilize the germ-counteracting agents in the manner indicated above, it will be understood that they may be employed in the form of oleaginous solutions, powders, emulsions, solutions in organic solvents such as alcohol, and the like. They may also be incorporated into a large variety of products such as mouth washes, dentifrices, hair tonics, ointments and salves, lipsticks, cough drops, nose drops, disinfectant preparations, foot powders, etc. In the production of powders, I have found it to be desirable to admix the germ-counteracting agents, in the form of strong aqueous solutions, with dry, inert carriers, preferably inorganic salts in anhydrous condition but which salts have the property of taking up water as water of crystallization.

It will be understood that individual ones of the germ-counteracting agents of the present invention or mixtures of two or more of them may be employed with or without previously known germ-counteracting agents which are compatible therewith.

While the invention has been described in detail, the scope thereof is not to be limited other than is set forth in the claims.

This application is a continuation-in-part of my prior application Serial No. 305,710, filed August 21, 1952, now Patent No. 2,678,316, dated May 11, 1954, which, in turn, is a continuation-in-part of application Serial No. 702,893, filed October 12, 1946, now abandoned, which latter application is a continuation-in-part of application Serial No. 572,963, filed January 15, 1945, now abandoned.

What I claim is new and desire to protect by the Letters Patent of the United States is:

1. A germ-counteracting agent having the formula

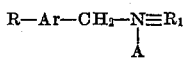

where R is an alkyl group containing from 12 to 18 carbon atoms, Ar is an aromatic hydrocarbon radical selected from the group consisting of naphthalene and alkyl-substituted naphthalene radicals in which the number of said last-mentioned alkyl groups does not exceed 3 and in which the number of carbon atoms in each of said last-mentioned alkyl radicals is from 1 to 4, $N\equiv R_1$ is a tertiary amine having a total of not more than 10 carbon atoms and containing only carbon, hydrogen and nitrogen, said tertiary amine being selected from the group consisting of aliphatic saturated amines, heterocyclic amines, and lower alkyl aryl amines, and A is a salt-forming anionic radical.

2. A germ-counteracting agent in accordance with claim 1, in which $N\equiv R_1$ is a heterocyclic amine and A is chlorine.

3. A germ-counteracting agent in accordance with claim 1, in which $N\equiv R_1$ is an alkyl amine in which the number of carbon atoms in any single alkyl radical does not exceed 5, and A is chlorine.

4. A germ-counteracting agent in accordance with claim 1, wherein R is dodecyl, $N\equiv R_1$ is an alkyl amine in which the number of carbon atoms in any single alkyl radical does not exceed 5, and A is chlorine.

5. A germicidal agent having the formula

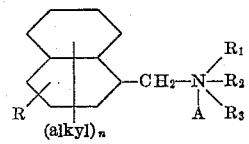

where R is an alkyl radical containing from 12 to 18 carbon atoms, alkyl is an alkyl radical containing from 1 to 4 carbon atoms, $n$ is an integer from 1 to 3, $R_1$, $R_2$ and $R_3$ are alkyl radicals each containing from 1 to 5 carbon atoms, and A is a salt-forming anionic radical.

6. A germicidal agent having the formula

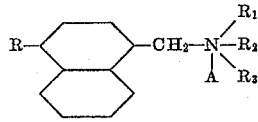

where R is an alkyl radical containing from 12 to 18 carbon atoms, $R_1$, $R_2$ and $R_3$ are alkyl radicals each containing from 1 to 5 carbon atoms, and A is a salt-forming anionic radical.

7. A germ-counteracting agent having the formula

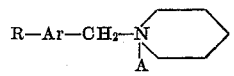

where R is an alkyl radical containing from 12 to 16 carbon atoms, Ar is a naphthalene hydrocarbon radical, and A is chlorine.

8. Dodecyl naphthyl pyridinium chloride having the following structural formula

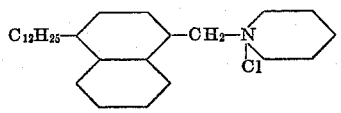

9. Dodecyl lower alkyl naphthyl pyridinium chloride having the formula

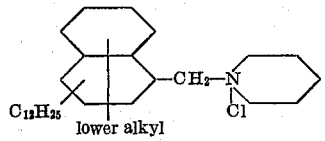

References Cited in the file of this patent

UNITED STATES PATENTS 2,678,316    Harris _____ May 11, 1954

FOREIGN PATENTS 659,353    Great Britain _____ Oct. 24, 1951